United States Patent [19]
Uchibori

[11] Patent Number: 5,485,844
[45] Date of Patent: Jan. 23, 1996

[54] DOPPLER-TYPE ULTRASONIC DIAGNOSTIC APPARATUS

[75] Inventor: Takanobu Uchibori, Tochigi, Japan

[73] Assignee: Kabushiki Kaisha Toshiba, Kanagawa, Japan

[21] Appl. No.: 243,874

[22] Filed: May 17, 1994

[30] Foreign Application Priority Data

May 18, 1993 [JP] Japan ..................... 5-115897

[51] Int. Cl.⁶ ..................................................... A61B 8/06
[52] U.S. Cl. ........................................................ 128/661.09
[58] Field of Search ........................... 128/660.07, 661.0, 128/661.07–661.10; 367/7; 73/626, 861.25; 364/413.25

[56] References Cited

U.S. PATENT DOCUMENTS

| | | | |
|---|---|---|---|
| 4,887,306 | 12/1989 | Hwang et al. | 382/54 |
| 5,215,094 | 6/1993 | Franklin et al. | 128/662.02 X |
| 5,249,578 | 10/1993 | Karp et al. | 128/661.01 |
| 5,271,404 | 12/1993 | Corl et al. | 128/661.09 X |
| 5,339,816 | 8/1994 | Akamatsu et al. | 128/661.09 |

FOREIGN PATENT DOCUMENTS 2-195947  8/1990  Japan.

*Primary Examiner*—Francis Jaworski
*Attorney, Agent, or Firm*—Finnegan, Henderson, Farabow, Garrett & Dunner

[57] ABSTRACT

A Doppler-type ultrasonic diagnostic apparatus is provided for smoothing a Doppler spectrum. In the apparatus, a tomographic image of a diagnostic portion of an object being examined is obtained, the diagnostic portion including a fluid in motion, and a range gate is placed at a position of the fluid on the tomographic image. The apparatus comprises an element for transmitting an ultrasonic beam signal for the diagnostic portion and receiving an ultrasonic echo signal reflected by the fluid, an element for converting the ultrasonic echo signal into a corresponding electrical echo signal, an element for extracting a Doppler signal from the electrical echo signal, the the Doppler signal being formed by the fluid flowing at the position of the range gate, an element for calculating data of a Doppler spectrum being composed of a plurality of instantaneous spectra each including a plurality of Doppler frequency components on the basis of the extracted Doppler signal, an element for smoothing the data of the Doppler spectrum, and an element for displaying the smoothed data of the Doppler spectrum.

19 Claims, 8 Drawing Sheets

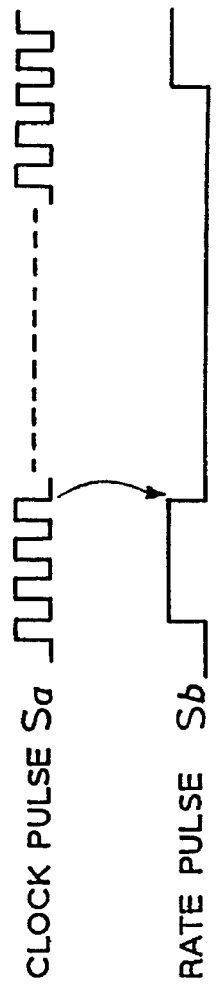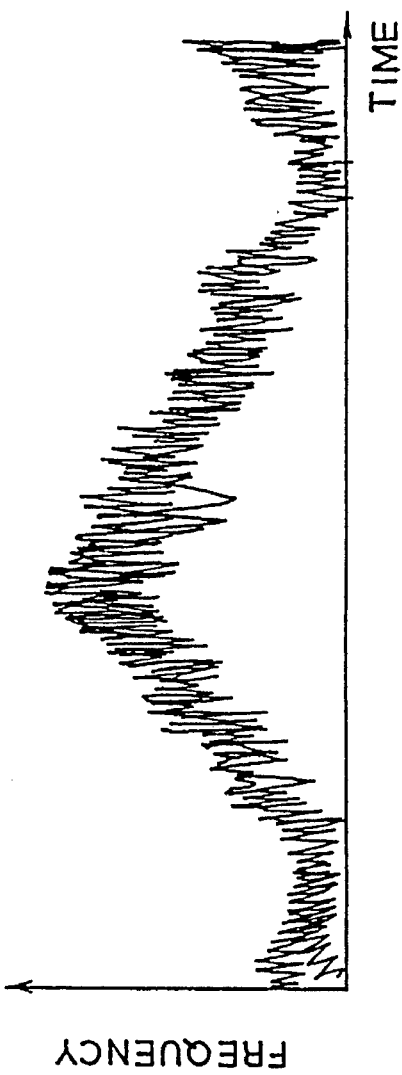

DOPPLER-TYPE ULTRASONIC DIAGNOSTIC APPARATUS

BACKGROUND OF THE INVENTION

The present invention relates to a Doppler-type diagnostic apparatus, and more particularly to the apparatus that is in use for diagnosing motion of fluids such as blood within an object being examined by utilizing the Doppler effect of ultrasonic signals.

At present, there has already been provided a Doppler-type ultrasonic diagnostic apparatus in which ultrasonic pulse Doppler and ultrasonic pulse reflection methods are used together to obtain a tomographic image (black/white B-mode image) and a real-time blood flow image through a single ultrasonic probe.

FIG. 1 exemplifies such a Doppler-type ultrasonic diagnostic apparatus by which the speed of a blood flow is measured as blood flow information. In the apparatus shown in the figure, connected to an ultrasonic probe 201 are a transmitting pulser 202 and receiving pre-amplifier 203. The output of the pre-amplifier 203 is connected, by way of a mixer 204, lowpass filter 205, sample and hold circuit 206, bandpass filter 207, and frequency analyzer 208, in turn, with a display unit 209.

Further, the diagnostic apparatus is also provided with a pulse generator 210 for transmitting/receiving control and a range gate circuit 211 for range gate control. The pulse generator 210 incorporates frequency dividers and gate circuits, thus supplying a clock pulse $S_a$ of a specific frequency (refer to FIG. 2) to the range gate circuit 211 and mixer 204, creating a rate pulse $S_b$ of ultrasonic repetition frequency (refer to FIG. 2) on the basis of the clock pulse $S_a$ and supplying it to the pulser 202 and range gate circuit 211.

The pulser 202 creates a high-voltage driving pulse using the supplied rate pulse $S_b$ in order to drive the ultrasonic probe 201. This driving allows the probe 201 to transmit an ultrasonic pulse signal into an object P. Part of the transmitted ultrasonic signal makes an ultrasonic echo signal by being reflected at the wall BW and blood flow B (mainly, red corpuscle) of a blood vessel BV. The ultrasonic echo signal will then be received by the probe 201, where a corresponding electrical echo signal $S_d$ (refer to FIG. 2) is yielded.

The electrical echo signal $S_d$ reflects the Doppler effect, that is, the Doppler shift in frequency caused by scattering of the ultrasonic signal by corpuscles in motion. According to this effect, the central frequency $f_c$ of a received ultrasonic echo signal changes by a Doppler shift frequency $f_d$, thus making its receiving frequency $f=f_c+f_d$. The Doppler shift frequency $f_d$ is approximately expressed as follows by assuming a blood flow speed is v, an angle between an ultrasonic beam and a blood vessel is θ, and a sound speed is c.

$$f_d = \{(2 \cdot v \cdot \cos\theta 19 f_c)/c\} \cdot f_c$$

Detecting the Doppler shift frequency fd from the received electrical echo signal Sd provides the blood flow speed v, which gives a foundation to the receiving system of the present Doppler-type ultrasonic diagnostic apparatus. In detail, the electrical echo signal $S_d$ is amplified by the pre-amplifier 203 and then sent to the mixer 204, where the amplified echo signal $S_d$ is mixed with the clock pulse $S_a$ to be supplied to the next lowpass filter 205. The mixed signal is lowpassed by the lowpass filter 205, so that higher-frequency components such as an ultrasonic carrier are removed from the mixed signal; only low frequency components centered on the Doppler shift frequency $f_d$ are sent to the sample and hold circuit 206.

By using a sampling pulse $S_c$ (refer to FIG. 2) that corresponds to the distance from the surface of an object to the position O of a range gate (i.e., sampling point or sampling volume) placed on a blood flow B of a tomographic image, the filtered signal is then sampled and held by the sample and hold circuit 206, the held signal being sent to the bandpass filter 207 by which excessive higher and lower frequency components are removed to extract only the Doppler shift frequency component of the blood flow B. The extracted signal is then frequency-analyzed with fast Fourier transformation, for example, for obtaining a frequency spectrum pattern of Doppler shift frequencies (i.e., Doppler spectrum). This Doppler spectrum, which is displayed on the display unit 209 as shown in FIG. 3, represents changes in Doppler shift frequency in a two-dimensional coordinate system whose vertical axis is assigned to the frequency and its horizontal axis to time, where strength of each frequency component is depicted by altering pixel brightness.

For a further examination of blood flows, it is sometimes required to observe changes in time of maximum speeds of blood flows. In such observation, the maximum frequencies of a real-time Doppler spectrum are automatically traced on its image or the maximum frequencies of a frozen Doppler spectrum are traced by hand, as shown by a bold line MF in FIG. 4, so that the traced values (maximum frequencies) are extracted.

Another analysis technique is to use a histogram of flow speeds, which is a speed component distribution where its horizontal axis is assigned to frequencies (i.e., Doppler shift frequencies corresponding to blood flow speeds) and its vertical axis is assigned to powers (strength) of respective frequencies. To obtain the histogram of blood flows, a Doppler spectrum image is first frozen and a desired time position in the horizontal axis of the spectrum image is then specified with a cursor marker (for instance, refer to a marker MT in FIG. 5). In response to this, a calculator (not shown) works to calculate a distribution of speed components at the specified time position. The calculated distribution data is normally displayed as shown in FIG. 6.

However, there are a wide variety of drawbacks in the above image processing. All of those drawbacks are resulted from the fact that the ultrasonic echo signal received by the probe 201 includes known speckle components caused by phase interferences of reflected echoes of corpuscles in a blood flow.

Concretely, the speckle components makes a Doppler spectrum change little by little, but rough, in the vertical frequency (blood flow) direction, as shown in FIG. 3, and a histogram of flow speeds changes largely and narrowly in the vertical power axis, as shown in FIG. 6, thus deteriorating accuracy in displaying a blood flow.

As a result, when a Doppler spectrum is observed, it is difficult to recognize a steady frequency range at a glance, because there are large changes in the frequency and density.

In addition, automatic or manual tracing the maximum frequencies on a Doppler spectrum results in small and frequent ups and downs of a traced curve, which makes the tracing difficult and inefficient and imposes comparatively heavy burden on an operator.

Further, when such a histogram of flow speeds shown in FIG. 6 is observed, it is hard to recognize how the entire histogram image spreads. In this case, it is necessary to repeat the specification of another time position on a Doppler histogram for displaying revised histogram images.

3

This operation necessarily involves frequently-repeated judgement of whether or not a histogram image now on is an observable distribution images. Therefore, in case of obtaining a histogram of flow speeds by the conventional technique, much operation load will be put on an operator and a diagnostic time will be longer.

SUMMARY OF THE INVENTION

Accordingly, it is a primary object of the present invention to provide a Doppler-type ultrasonic diagnostic apparatus that is able to display a Doppler spectrum having a superior visibility by suppressing changes in its frequency-axis direction which are caused due to speckle components.

Further, it is another primary object to provide a Doppler-type ultrasonic diagnostic apparatus by which maximum frequencies on a Doppler spectrum can be traced easily, and efficiently, other than accurately.

Still further, it is another primary object to provide a Doppler-type ultrasonic diagnostic apparatus that is able to not only display a histogram of flow speeds whose entire spread is easily recognizable by suppressing changes in its power-axis direction caused due to speckle components but reduce operational load and a required diagnostic time.

These and other objects can be achieved according to the present invention, in one aspect by providing a Doppler-type ultrasonic diagnostic apparatus, in which a tomographic image of a diagnostic portion of an object being examined is obtained, the diagnostic portion including a fluid in motion, and a range gate is placed at a position of the fluid on the tomographic image, the apparatus comprising: an element for transmitting an ultrasonic beam signal for the diagnostic portion and receiving an ultrasonic echo signal reflected by the fluid; an element for converting the ultrasonic echo signal into a corresponding electrical echo signal; an element for extracting a Doppler signal from the electrical echo signal, said the Doppler signal being formed by the fluid flowing at the position of the range gate; an element for calculating data of a Doppler spectrum being composed of a plurality of instantaneous spectra each including a plurality of Doppler frequency components on the basis of the extracted Doppler signal, said Doppler spectrum having a two-dimension coordinate consisting of a time axis and a Doppler shift frequency axis corresponding to a flow speed of the fluid; an element for smoothing the data of the Doppler spectrum; and an element for displaying the smoothed data of the Doppler spectrum.

As another aspect of the present invention, there is provided a Doppler-type ultrasonic diagnostic apparatus comprises, in addition to the above construction, an element for tracing maximum frequencies of the smoothed data of the Doppler spectrum.

Further, as another aspect of the present invention, there is provided a Doppler-type ultrasonic diagnostic apparatus, in which a tomographic image of a diagnostic portion of an object being examined is obtained, the diagnostic portion including a fluid in motion, and a range gate is placed at a position of the fluid on the tomographic image, the apparatus comprising: an element for transmitting an ultrasonic beam signal for the diagnostic portion and receiving an ultrasonic echo signal reflected by the fluid; an element for converting the ultrasonic echo signal into a corresponding electrical echo signal; an element for extracting a Doppler signal from the electrical echo signal, said the Doppler signal being formed by the fluid flowing at the position of the range gate; a first element for calculating data of a Doppler spectrum being composed of a plurality of instantaneous spectra each including a plurality of Doppler frequency components on the basis of the extracted Doppler signal, the Doppler spectrum having a two-dimension coordinate consisting of a time axis and a Doppler shift frequency axis corresponding to a flow speed of the fluid; an element for smoothing the data of the Doppler spectrum; a first element for displaying the smoothed data of the Doppler spectrum; an element for freezing the Doppler spectrum displayed by the first displaying element; an element for specifying an arbitrary time position on the Doppler spectrum frozen-displayed by the first displaying element; a second element for calculating data of a histogram of flow speeds of the fluid from the data of the Doppler spectrum in accordance with the time position specified by the specifying element; and a second element for displaying the data of the histogram of flow speeds calculated by the second calculating element.

BRIEF DESCRIPTION OF THE DRAWINGS

The accompanying drawings which are incorporated in and constitute a part of this specification, illustrate embodiments of the present invention and, together with the description, serve to explain the principles of the present invention; in which:

FIG. 2 shows a timing chart of operation in the conventional apparatus shown in FIG. 1;

FIG. 3 exemplifies a conventional Doppler spectrum;

DESCRIPTION OF THE PREFERRED EMBODIMENTS

An embodiment of the present invention will now be described with reference to FIGS. 7 to 13.

Figure 7:
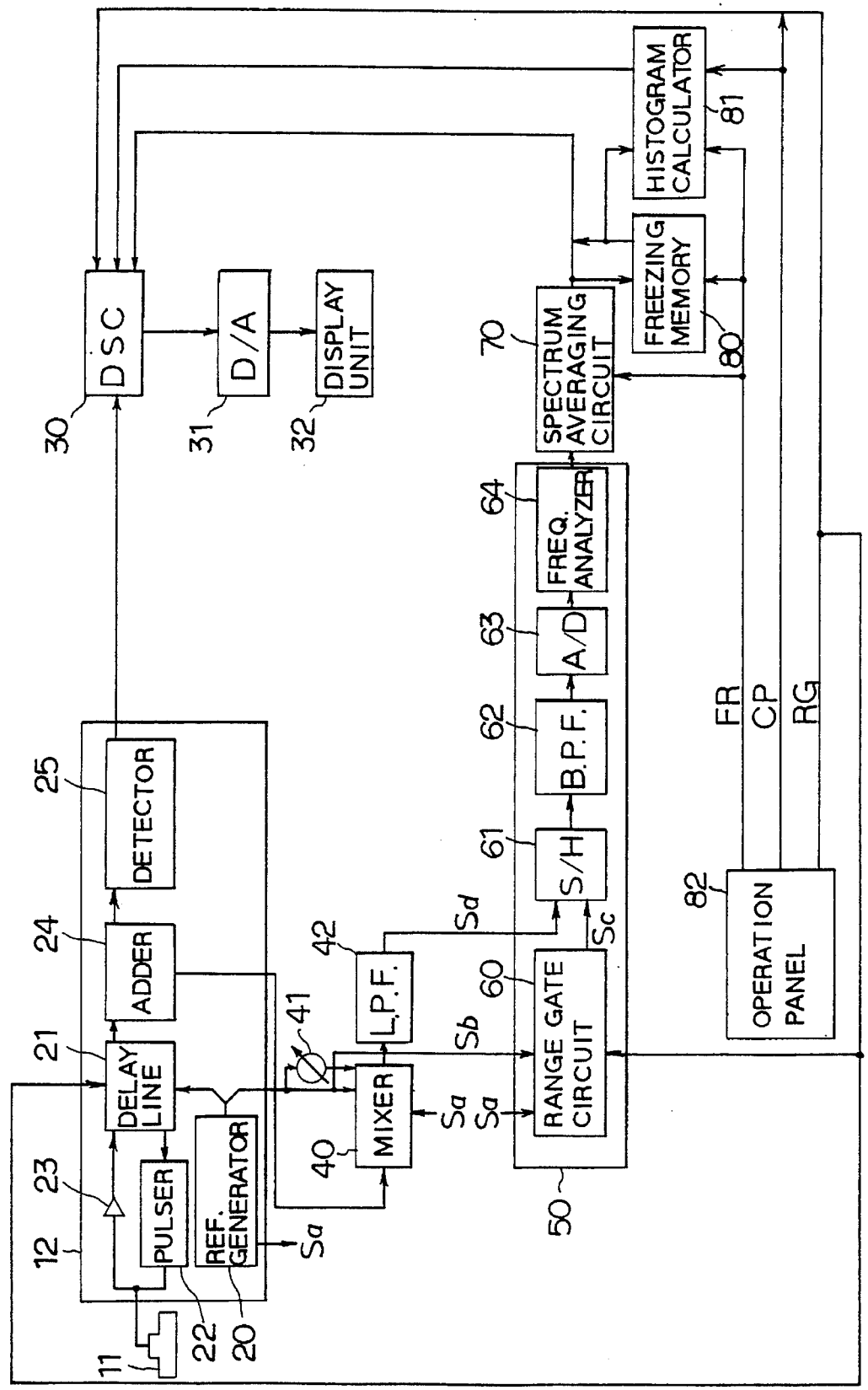
FIG. 7 is a block diagram showing a Doppler-type ultrasonic diagnostic apparatus according to one embodiment of the present invention.

A Doppler-type ultrasonic diagnostic apparatus according to the present embodiment, as shown in FIG. 7, is provided with an electronic-scanning-type ultrasonic probe (hereafter, referred to as "probe") 11 and an electronic scanning section 12.

The electronic scanning section 12 is further provided with a reference oscillator 20 for generating a reference clock, a delay line 21 for creating a delay driving signal based on the reference signal, and a pulser 22 for driving a group of phased array transducers arranged in the probe 11 by means of receiving the delay driving signal from the delay line 21. The delay line 21 is also used in receiving an ultrasonic echo signal. The electronic scanning section 12 also incorporates a receiving system; that is, it is provided with a pre-amplifier 23 connected with the probe 11, the delay line 21 delaying a signal outputted from the pre-amplifier 23, an adder 24 adding a delayed signal outputted from the delay line 21, and a detector 25 performing logarithmic amplification and envelope detection on an output signal of the adder 24. The delay line 21 and adder 24 permit a received ultrasonic echo signal to be beam-formed, thus an electronic scanning being carried out.

The output signal of the detector 25 will be supplied, as an image signal composing a B-mode tomographic image, to a DSC (Digital Scan Converter) 30, where the signal thus-supplied is converted into a signal in standard TV scanning. The converted signal by the DSC 30 is then given, via a D/A converter 31, to a display unit 32 (CRT in this embodiment).

The output of the adder 24 in the electronic scanning section 12 is also connected, through a mixer 40 for use in phase detection, to a lowpass filter 42. Although not shown in detail in the figure, two channels for sine and cosine function signals are given to the mixer 40 and lowpass filter 42, respectively. The output of the reference oscillator 20 in the electronic scanning section 12 is directly connected to one channel input of the mixer 40, while it is connected, via a 90° phase shifter 41, to the other channel input of the mixer 40. Such construction makes it possible to not only provide the mixer 40 a beam-formed echo signal in the electronic scanning section 12 but provide the two channel inputs of mixer 40 reference signals $f_o$ and $f_o$ having a difference of 90° in phase to each other. The mixer 40 will thus send a Doppler shift signal "$f_d$" and a signal of "$2f_o+f_d$" to the lowpass filter 42, where only high-frequency components among the mixed signal are removed to obtain the Doppler shift signal $f_d$. The Doppler shift signal $f_d$ corresponds to a phase detection output for calculating blood flow information and is then supplied to a next Doppler spectrum calculation section 50.

In the Doppler spectrum calculation section 50, provided are a range gate circuit 60 outputting a sampling pulse, a sample and hold circuit 61 receiving the sampling pulse, a bandpass filter 62 filtering an output signal of the sample and hold circuit 61, and A/D converter 63 digitizing an output signal of the filter 62, a frequency analyzer 64 analyzing in frequency an output signal of the A/D converter. There are two channels of signal processing in the sample and hold circuit 61, bandpass filter 62, and A/D converter 63 (not shown), respectively. The output of the frequency analyzer 64 is connected to the DSC 30 through a spectrum averaging circuit 70.

The sample and hold circuit 61 is provided for extracting a Doppler signal of a blood flow at only a specified depth within an object, whose target signal is therefore a phase-detected output signal $S_d$ supplied from the lowpass filter 42.

The range gate circuit 60 is constructed in a manner that it is capable of setting arbitrarily a delay time on the basis of a range gate position signal RG given from an operation panel 82 which will be later described. Hence, supplied from the range gate circuit 60 to the sample and hold circuit 61 is a sampling pulse $S_c$, having a specified pulse width, delayed from a rate pulse $S_b$ by an interval corresponding to a period during which an ultrasonic signal travels back and forth between the positions of the probe 11 and a given range gate (sometimes, called as "sampling point" or "sampling volume"). Hence, the sample and hold circuit 61 will sample and hold the phase-detected signal outputted from the lowpass filter 42 using the thus-created sampling pulse $S_c$. The phase-detected signal thus-sampled and held then passes the bandpass filter 62, in which removed are harmonic components caused by sampling in the sample and hold circuit 61, permanent echo components from the wall of a blood vessel etc., and a Doppler shift component generated due to a comparatively slower motion of a blood flow, thus only a Doppler shift signal according to the true movement of a blood flow being extracted.

The frequency analyzer 64 has a fast Fourier transformer which performs frequency analysis of a Doppler shift signal sent from the A/D converter 63, the analysis results, that is, a Doppler spectrum (frequency spectrum pattern), being then sent, via the spectrum averaging circuit 70, to the DSC 30. This allows the display unit 32 to display the Doppler spectrum image and B-mode tomographic image in a divided form thereon.

Figure 8:
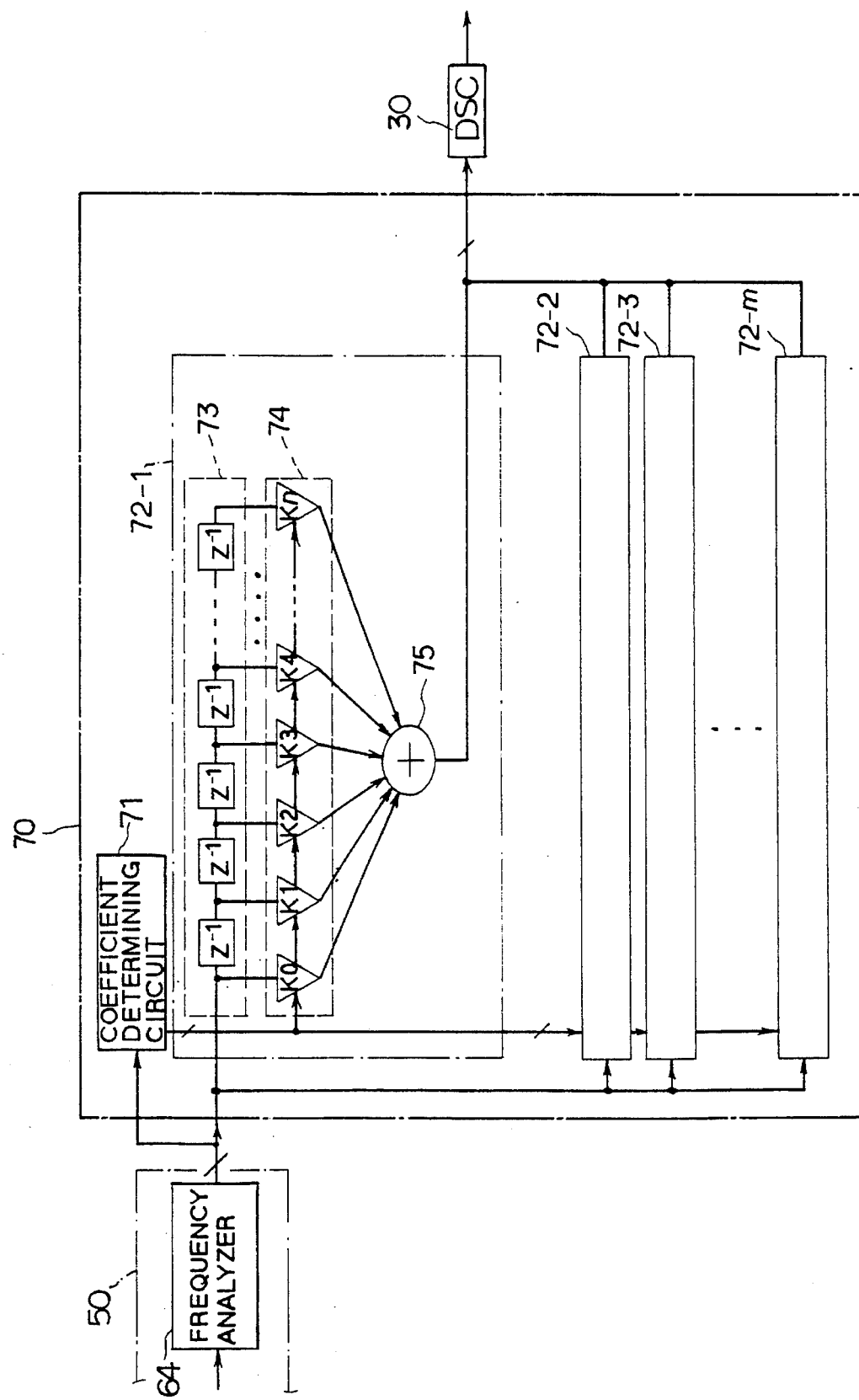
FIG. 8 shows in block form a spectrum averaging circuit incorporated in the apparatus of the embodiment.

As shown in FIG. 8, the spectrum averaging circuit 70 has a single coefficient determining circuit 71 and a plurality of weighting delay/addition circuits 72-1 to 72-m.

In the coefficient determining circuit 71, a speckle duration will be calculated on the basis of an average speed of a blood flow during a certain time and a plurality "n+1" of coefficients reflecting the speckle duration are determined to be supplied to the weighting delay/addition circuits 72-1 to 72-m, respectively. For example, assuming that the repetition frequency of a rate pulse is 3[kHz], a data number used in one-time FFT (Fast Fourier Transform) processing is 64 (in FIG. 8, m=64), a data number transferred between two-times of FFT processing is 8, the width of an ultrasonic beam is 1 [mm], and an average speed of a blood flow is 10[cm/sec], a speckle duration corresponding to the ultrasonic beam width is therefore $$1[mm]/10[cm/sec]=0.01[sec].$$

This speckle duration=0.01[sec] is then converted into 4 times of

FFT processing by $0.01/\{(1/3000)\times 8\}$.

Thus, "n+1" pieces of coefficients $K_0$ to $K_n$ are designated such as, for example, $$K_0=K_1=K_2=K_3=1.0 \text{ and}$$

$$K_4=K_n=0.0,$$

corresponding coefficient setting signals to those coefficients $K_0$ to $K_n$ being supplied to "m" pieces of the weighting delay/addition circuits 72-1 to 72-m, respectively.

Further, each of the weighting delay/addition circuits 72-1 to 72-m has a digital FIR (Finite Impulse Response) filter; it is provided with a delay element group 73 consisting of "n" pieces of delay elements, a multiplier group 74 consisting of "n+1" pieces of multipliers for each multiplying delayed outputs from the delay element group 73 by the coefficients, and an adder 75 adding the outputs of the multipliers.

The delay element group 73 in each of the delay/addition circuits 72-1 to 72-m will receive output signals from the frequency analyzer 64, the output signals consisting of the analysis results of individually-assigned frequency components to its delay element group 73, where the received signals will be delayed every sampling timing to be sent to higher-order elements. Each of the coefficient setting signals determined by the coefficient determining circuit 71 is supplied to the multiplier group 74 of the individual weighting delay/addition circuit 72-1 (to 72-m). The multipliers of n+1 pieces in the multiplier group 74 are capable of updating, in real time, their own coefficients $K_0$ to $K_n$ into specified values in response to the coefficient setting signals. In consequence, in each of the weighting delay/addition circuits 72-1 to 72-m, the analyzed data of each of the frequency components is weightedly delayed and added using the coefficients $K_0$ to $K_n$ determined on the basis of a speckle duration corresponding to an ultrasonic beam width. In other words, the results from the frequency analyzer 64, each frequency component, are averaged over time with moving average technique, each plurality of instantaneous spectra determined by a given period, by the digital filter (FIR filter), the averaged value being supplied to the DSC 30 for every frequency component.

In the present embodiment, although the time length of the moving average is assigned to a single speckle duration, the present invention is not necessarily limited to such value; it is possible to assign the time length several times or several fractions of a speckle duration. As to the coefficients, where their values are selected to be not zero, it is acceptable to select arbitrary values between "0" to "1" for them, not limited to "1" as explained above. Further, at the output side of the spectrum averaging circuit 70, as shown in FIG. 7, there is provided a freezing memory 80 and a histogram calculator 81. The freezing memory 80 is capable of not only updating and memorizing, every several frames, the averaged results supplied from the spectrum averaging circuit 70 at all times but providing the DSC 30 and histogram calculator 81 the averaged Doppler spectrum data at a specific frame that has been memorized so far, when a freezing signal FR is given from an operation panel 82. Hence, when an operator instructs the freezing of a Doppler spectrum through the operation panel 82, the image of a Doppler spectrum (i.e., averaged spectrum) that has been displayed in real time so far will be frozen. The histogram calculator 81 includes a computer unit and, in response to a freezing signal FR, reads in freezed Doppler spectrum data from the freezing memory 80. Moreover, the histogram calculator 81 is to calculate a distribution of fluid speed components, that is, a histogram of flow speeds at a specified timing, according to a later-described processing procedure in FIG. 9, for supplying the resultant calculation data to the DSC 30. Therefore, the histogram will also be imaged on the display unit 32.

The operation panel 82 is equipped with a track ball and/or key board, and using the operation panel 82, an operator is able to give the apparatus the range gate position signal RG and freezing signal FR and to give the histogram calculator 81 a calculation position (i.e., time position) signal CP at a specified time position on an averaged Doppler spectrum image on the display unit 82. In addition, corresponding to initiation of the range gate position signal RG and calculation position signal CP, data of specific markers are sent from a graphic memory (not shown) to the display unit 32 for their indication thereon.

The above range gate position signal RG is also sent to the delay line 21 of the electronic scanning section 12 for focusing a receiving ultrasonic beam along a scanning line including a specified range gate position.

Figure 9:
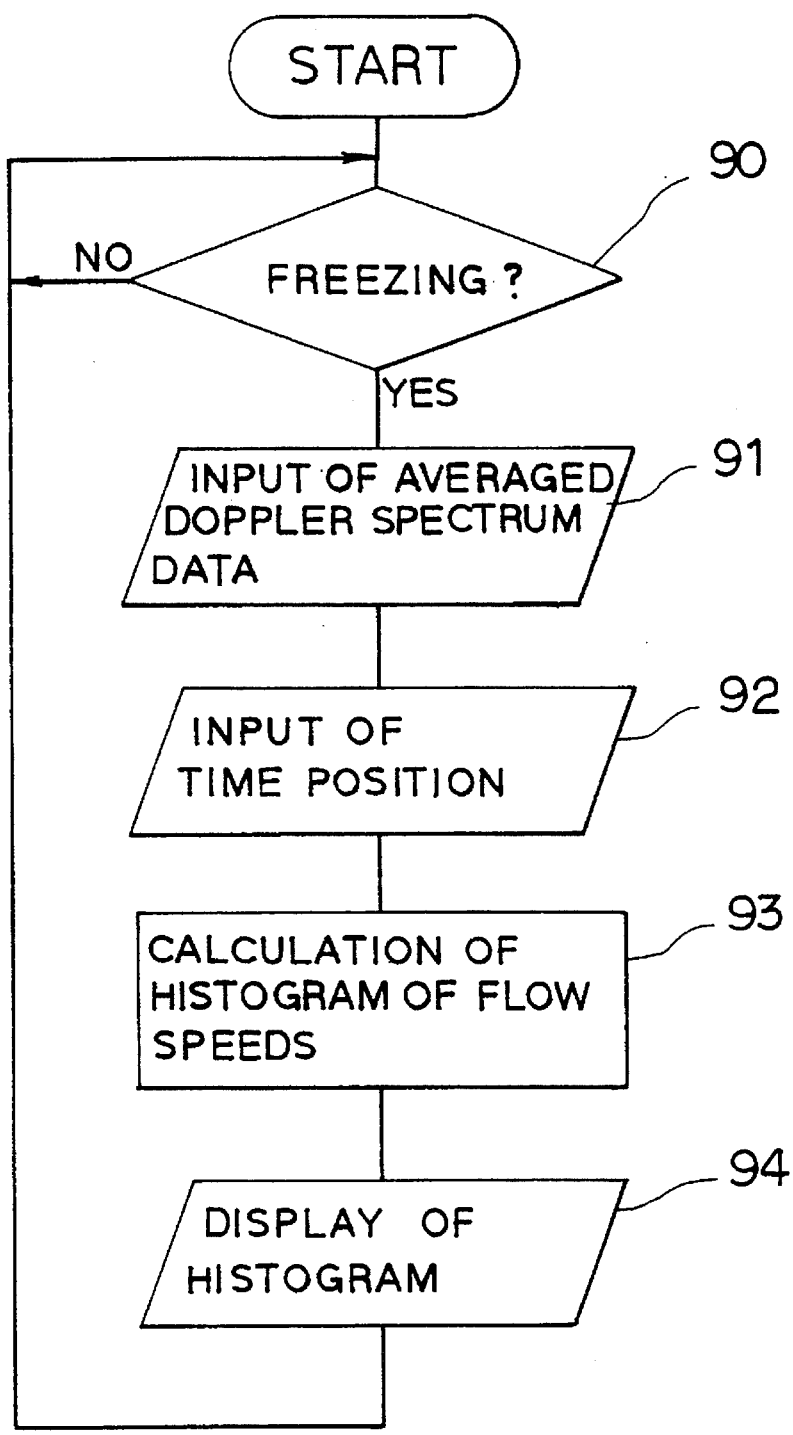
FIG. 9 is a flowchart explaining processing in a histogram calculator incorporated in the apparatus of the embodiment.

In the next place, the processing of the histogram calculator 81 will be explained according to FIG. 9.

At Step 90 in the figure, by the histogram calculator 81, a freezing signal FR is examined to judge whether or not freezing of a Doppler spectrum is ordered. If the judgement of NO is determined thereat (the freezing has not been ordered yet), the process at Step 90 will be repeated for waiting. In contrast, the judgement is YES (the freezing is ordered), Steps 91 and later will then be processed.

At Step 91, data of a Doppler spectrum (averaged data by the spectrum averaging circuit 70) in accordance with the freezing timing are taken from the freezing memory 80. Then at Step 92, a calculation position signal CP supplied from the operation panel 82, corresponding to a certain single point on the time axis (horizontal axis) of a Doppler spectrum now displayed, is taken in, the single point being specified by moving the position of a marker MT (refer to FIG. 12).

Then at Step 93, data of a histogram of flow speeds are formed as data of a distribution between frequency components (fluid speed components) and their powers (strengths) at a specified timing by the marker MT.

Then at Step 94, the data of the histogram calculated at Step 93 are displayed. As a result, displayed on the display unit 32 is a histogram image of flow speeds shown in FIG. 13, for instance, together with its tomographic and Doppler spectrum images.

As explained above, in this embodiment, the mixer 40, lowpass filter 42, range gate circuit 60, sample and hold circuit 61, and bandpass filter 62 composes Doppler signal extracting means. The A/D converter 63 and frequency analyzer 64 composes the Doppler spectrum calculating means. The spectrum averaging circuit 70 corresponds to the Doppler spectrum data smoothing means.

Now, the entire operation will be explained. When the Doppler-type ultrasonic diagnostic apparatus begins to work, in response to a rate pulse $S_b$ supplied from the reference oscillator 20 and a scanning signal (for example, a signal according to a sector scanning) specifying a sampling mode and a raster address, which is supplied from a control circuit (not shown), the electronic scanning section 12 drives the probe 11 to transmit an ultrasonic beam signal into an object being examined. The ultrasonic beam signal is then reflected in the object to be received by the probe 11. From the probe 11, the converted electrical echo signal is sent to the electronic scanning section 12, where the echo signal is formed to have its receiving focus by beam forming process and is detected and converted into image signals at a specified raster address. Such image signals forming a B-mode tomographic image are then supplied to the DSC 30.

On one hand, the echo signal at a specified raster address, which is focused in the electronic scanning section 12, is phase-detected by the mixer 40 and lowpass filter 42, being supplied to the Doppler spectrum calculation section 50. In this calculation section 50, a Doppler signal at a specified range gate position is sampled from the phase-detected echo signal and its signal is processed by a real-time frequency analysis. The resultant data of Doppler spectrum is forwarded to the spectrum averaging circuit 70.

In the spectrum averaging circuit 70, the Doppler spectrum data (a plurality of instantaneous spectra), each frequency component, are then averaged over a period corresponding to the speckle duration, the averaged data being sent to the DSC 30.

In the DSC 30, the B-mode image data and averaged Doppler spectrum data are combined and converted into image data of the standard TV scanning, and sent to the display unit 32 via the D/A converter 31. In consequence, displayed in a divided form on the display unit 32 are a B-mode tomographic image and a Doppler spectrum of a diagnostic portion.

Figure 10:
FIG. 10 is a Doppler spectrum according to the embodiment.

The averaged Doppler spectrum is shown in real time as in FIG. 10, for instance, where the horizontal axis is assigned to time and the vertical axis to Doppler shift frequencies (i.e., fluid speeds). Comparing with the aforementioned conventional technique illustrated in FIG. 3, the Doppler spectrum in FIG. 10 is depicted as a entirely denser picture whose upper and lower edges are smoothed and simplified profiles to form a clear band shape. In short, the Doppler spectrum excludes little by little changes in its vertical direction and large changes in degrees of density, both of which had been seen frequently before due to the speckle components. Therefore, for an operator, the visibility of the Doppler spectrum will be greatly improved to provide a more distinguishable frequency band width.

Figure 1:
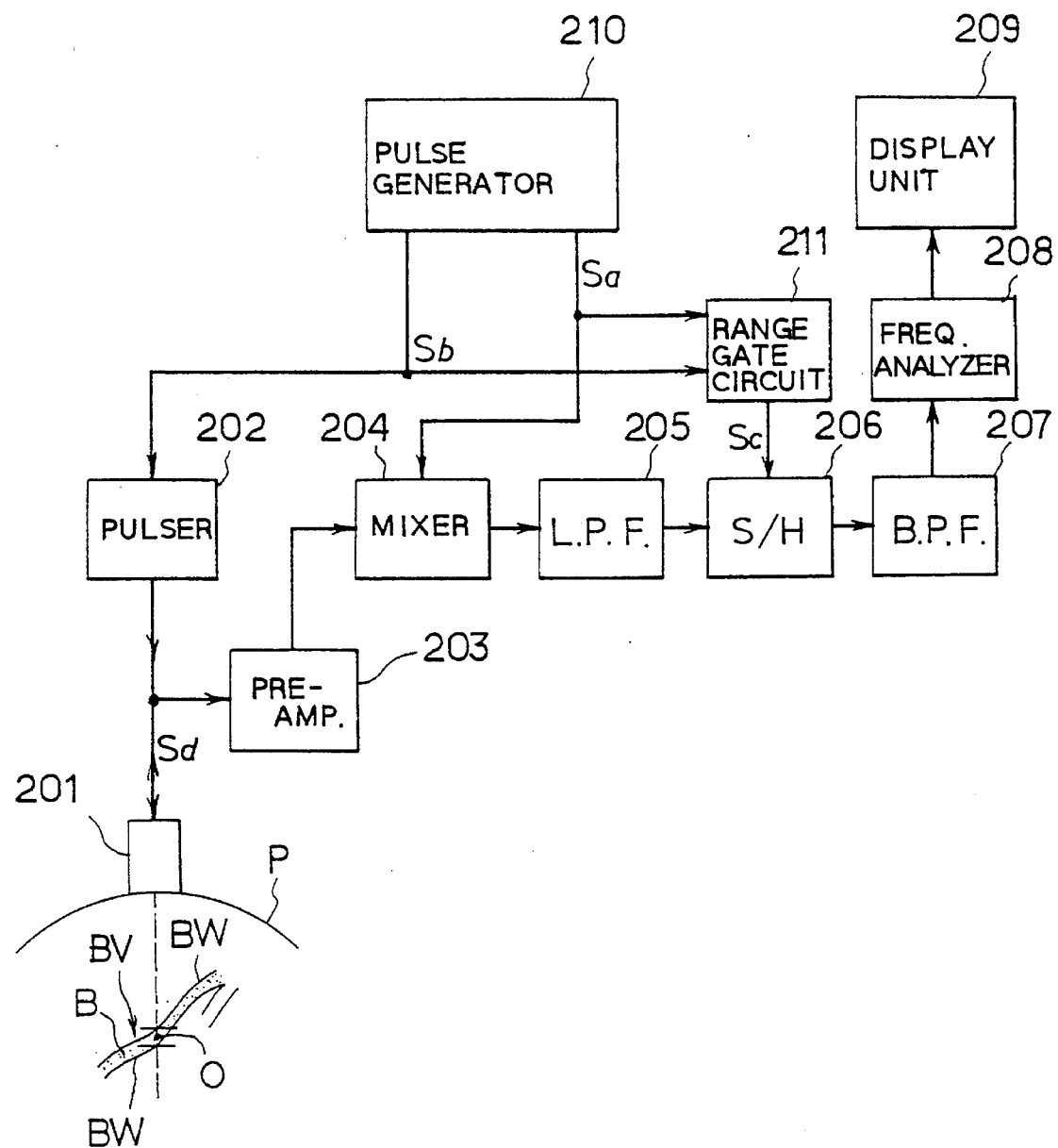
FIG. 1 is a block diagram showing a conventional Doppler-type ultrasonic diagnostic apparatus.
Figure 4:
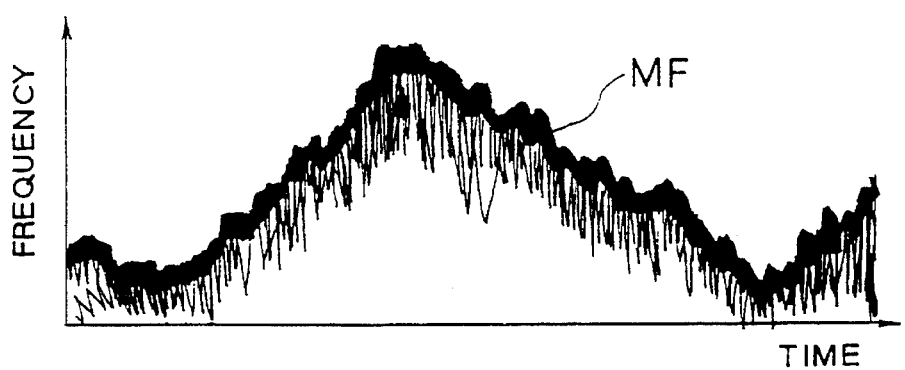
FIG. 4 is a conventional Doppler spectrum explaining a trace of its maximum frequencies.
Figure 5:
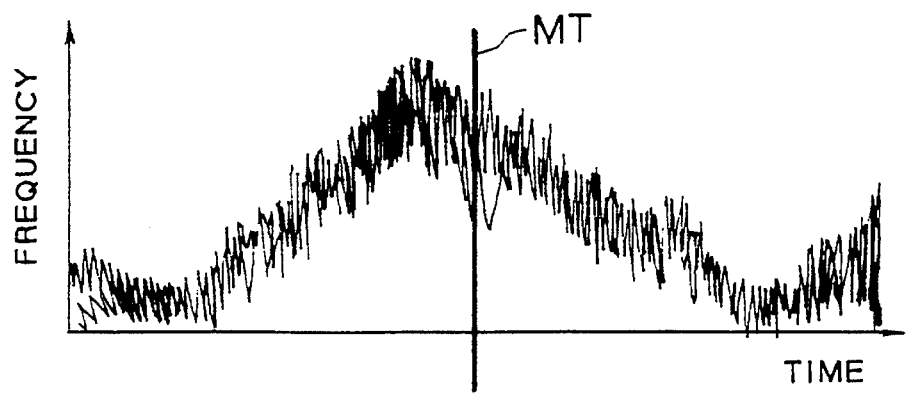
FIG. 5 is an image explaining a situation in which a desired time position is specified by a marker on an imaged Doppler spectrum.
Figure 11:
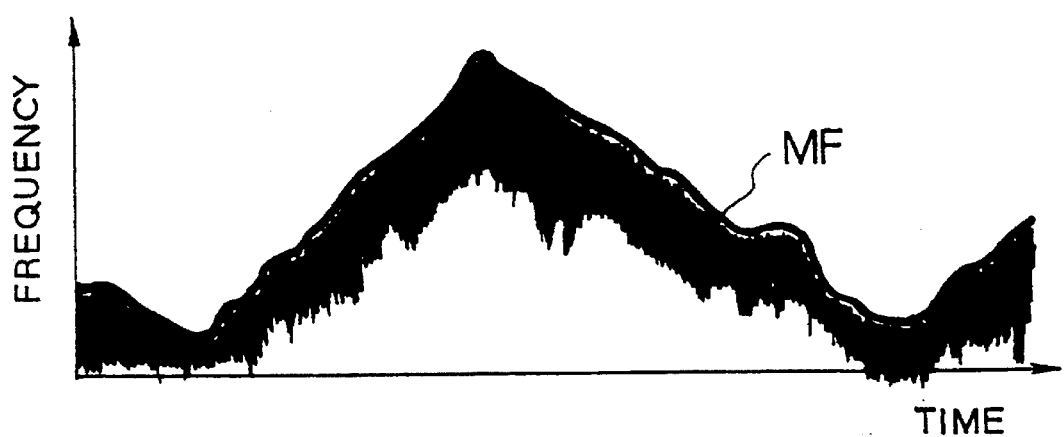
FIG. 11 exemplifies a trace of maximum frequencies on a Doppler spectrum of the embodiment.

On one hand, in case where the maximum frequencies are traced on a Doppler spectrum by hand, its image will be frozen first. Then such a device as a track ball is operated to trace the maximum frequencies (i.e., maximum blood flow speeds) on the frozen Doppler spectrum image, as illustrated in FIG. 11 (refer to a bold line MF therein). Since the upper edge profile has been simplified and smoothed by means of averaging, having reduced its meaningless ups and downs in the vertical direction compared with the conventional non-averaged Doppler spectrum (refer to FIG. 4), it is easy to recognize a profile where tracing should be done. Thus the manual tracing operation can be done efficiently and accurately in a shorter operation time.

In case of automatic tracing, the maximum frequencies of a real-time or frozen Doppler spectrum are extracted by the DSC 30 and displayed by the display unit 32, as shown in FIG. 11. The objected Doppler spectrum has been averaged also in this case, in consequence the traced maximum frequency curve is also smoothed, without meaningless ups and downs, and easy to observe.

Figure 12:
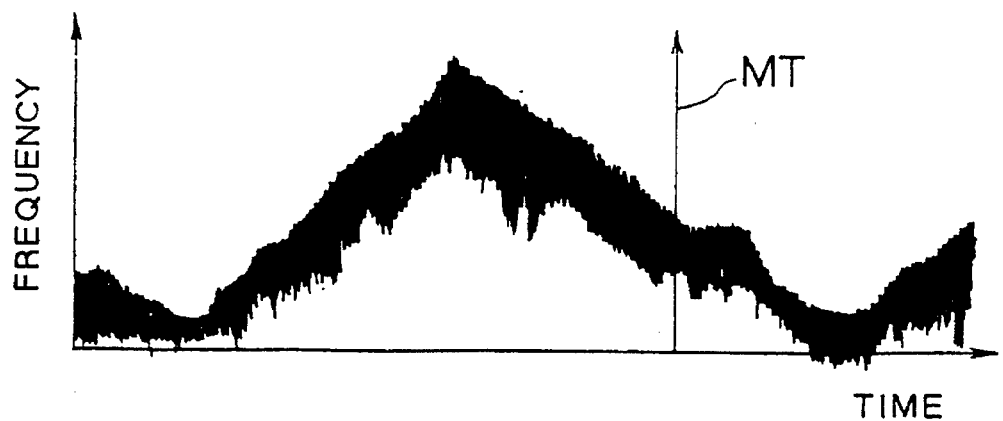
FIG. 12 exemplifies specification of a desired time position by a marker on a Doppler histogram of the embodiment.

Furthermore, in case of displaying a histogram of flow speeds, an operator handles the operation panel 82 to output a freezing signal FR. In response to this, the processing of Steps 91 to 95 in FIG. 9 is carried out by the histogram calculator 81; through the processing, a position (time) being calculated is specified by a marker MT, as shown in FIG. 12, and a histogram of flow speeds at the specified timing is displayed as shown in FIG. 13 on the display unit 32, together with other produced images.

Figure 6:
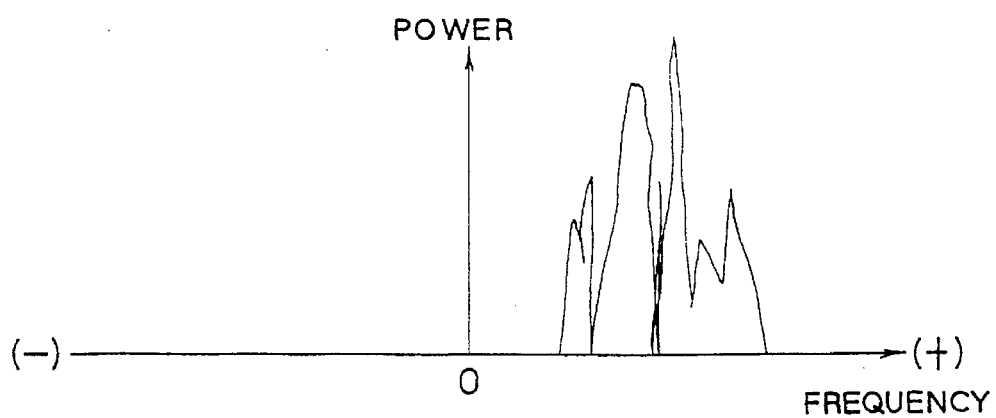
FIG. 6 is a conventional histogram of flow speeds.
Figure 13:
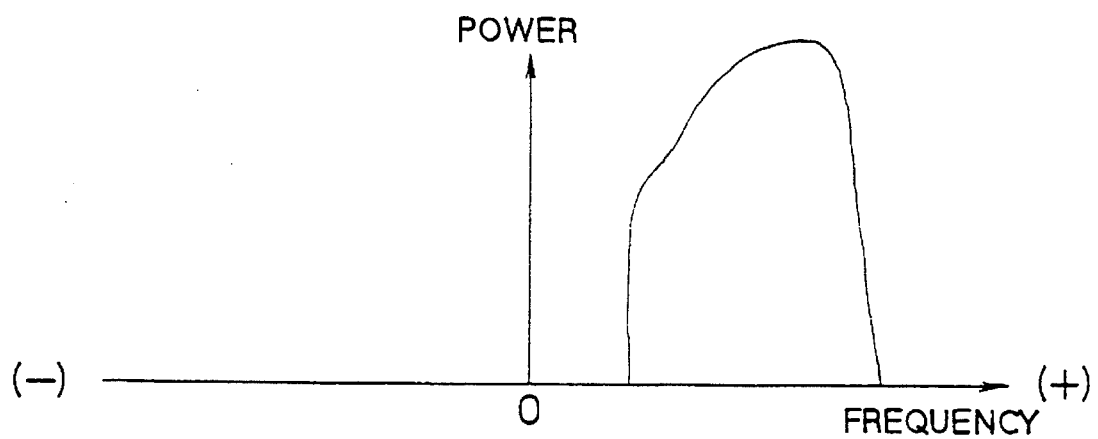
FIG. 13 is one example of a histogram of flow speeds according to the embodiment.

As can be understood from FIG. 13, the averaging over time enables the flow speed histogram thus-displayed to substantially suppress little by little changes in its vertical direction representing power, as compared with the conventional one in FIG. 6. In other words, little by little changes in power resulted from speckle components are eliminated to be smooth over its entire range of flow distribution.

In this way, the histogram is automatically and quickly displayed that reflects an honest blood flow and is less changes in the vertical direction. This improvement helps the easier recognition of the whole histogram image. Further, there is almost no need for repeatedly setting a time position on the Doppler histogram image and/or repeatedly judging whether an observable histogram image is obtained or not, which noticeably reduces operation load to the operator and greatly shortens a diagnostic time accompanying analysis of the histogram.

Other variations according to the present inventions are possible. In the above-mentioned embodiment, by the coefficient determining circuit 71, the speckle duration has been calculated on an averaged blood flow speed during a fixed time and the coefficients have been determined on the basis of the calculated speckle duration, while variations for this technique are as follows; (i) as to the speckle duration, the speckle duration may be calculated on the basis of an averaged or maximum momentary speed of blood flows with the flow speed of blood adjusted by its averaged or maximum momentary speed, (ii) as to the coefficients, there are two ways: one is that change rates (acceleration) in averaged or maximum momentary speeds of blood flows are calculated to work out a time length (e.g., the larger acceleration, the smaller time length) when characteristics of flows are regarded as almost the same, the regarded time length being involved in determining the coefficients, the other is that an arbitrary time length is set by an operator through the operation panel 82 and the arbitrary time length is used in determining the coefficients. In this manual specification, an initial Doppler spectrum image is once displayed according to an arbitrary time length. If the displayed spectrum image is yet unsatisfied, the time length will be changed by hand in a try and error manner. Such a construction of the apparatus has an advantage of less processing amount in CPUs. Further, an operator may select and specify one of fixed values, preset as the time length, according to different typical diagnostic portions.

Moreover, in the multiplier group 74 of the spectrum averaging circuit 70 in the above embodiment, every frequency data, the results from four multipliers, individually using four coefficients $K_0$ to $K_3$ (=1), are added (averaged), while a hold means for holding the maximum among the results from the four multipliers may be provided for outputting the maximum of each frequency data, respectively. The number of multipliers, which are used in averaging or maximum detecting, is not limited to four; any number is acceptable.

Still moreover, although the above spectrum averaging circuit 70 has adopted a way by which each frequency component is averaged over time, the way is not so limited, possible are averaging frequency data over their frequency direction by using a known averaging circuit such as a FIR filter and/or maximum-detecting frequency data over their frequency direction by using a known maximum detecting circuit, those circuits being placed instead of the spectrum averaging circuit 70 in the figure.

Obviously, further modifications and variations of the present invention are possible in light of the above teachings. It is therefore to be understood that within the scope of the appended claims, the invention may be practiced otherwise than as specifically described therein.

What we claim is:

1. A Doppler-type ultrasonic diagnostic apparatus, in which a diagnostic portion of an object being examined is scanned by an ultrasonic beam signal, said diagnostic portion including a fluid such as blood in motion, the apparatus comprising:

means for transmitting the ultrasonic beam signal into the diagnostic portion and receiving an ultrasonic echo signal reflected by the diagnostic portion;

means for converting the ultrasonic echo signal into a corresponding electrical echo signal;

means for extracting a Doppler signal from the electrical echo signal, said the Doppler signal being formed by the fluid;

means for calculating data of a Doppler spectrum consisting of a plurality of instantaneous spectra each including a plurality of Doppler frequency components from the extracted Doppler signal, said Doppler spectrum having two dimensions consisting of a time dimension and a Doppler shift frequency dimension corresponding to a flow speed of the fluid;

means for smoothing the data of the Doppler spectrum in accordance with a speckle duration corresponding to a width of the ultrasonic beam signal; and means for displaying the smoothed data of the Doppler spectrum.

2. The Doppler-type ultrasonic diagnostic apparatus according to claim 1, wherein said smoothing means comprises means for averaging each frequency component of the plurality of instantaneous spectra determined from a time interval depending on the speckle duration over either one of a time direction and a frequency direction of the plurality of instantaneous spectra.

3. The Doppler-type ultrasonic diagnostic apparatus according to claim 2, wherein said averaging means includes means for specifying the time interval by hand.

4. The Doppler-type ultrasonic diagnostic apparatus according to claim 2, wherein said averaging means includes a time calculating means for automatically calculating the time interval.

5. The Doppler-type ultrasonic diagnostic apparatus according to claim 4, wherein said time calculating means is a means for calculating a change rate in a flow speed of the fluid and determining, using the calculated change rate, the time interval during which characteristics of flow of the fluid are considered to be constant.

6. The Doppler-type ultrasonic diagnostic apparatus according to claim 2, wherein said averaging means includes a time calculating means for automatically calculating the time interval, a coefficient calculating means for calculating a coefficient corresponding to the calculated time interval, and an weighting delay/addition means for weightedly delaying and adding each frequency component of the plurality of instantaneous spectra using the calculated coefficient.

7. The Doppler-type ultrasonic diagnostic apparatus according to claim 6, wherein said time calculating means is a means for calculating a change rate in a flow speed of the fluid and determining, using the calculated change rate, the time interval during which characteristics of flow of the fluid are considered to be constant.

8. The Doppler-type ultrasonic diagnostic apparatus according to claim 6, wherein said weighting delay/addition means is a moving average circuit comprising a digital FIR filter.

9. The Doppler-type ultrasonic diagnostic apparatus according to claim 1, wherein said smoothing means comprises means for detecting maximums of each frequency component of the plurality of instantaneous spectra determined from a time interval depending on the speckle duration over either one of a time direction and a frequency direction of the plurality of instantaneous spectra.

10. A Doppler-type ultrasonic diagnostic apparatus, in which a diagnostic portion of an object being examined is scanned by an ultrasonic beam signal, said diagnostic portion including a fluid such as blood in motion, the apparatus comprising:

means for transmitting the ultrasonic beam signal into the diagnostic portion and receiving an ultrasonic echo signal reflected by the diagnostic portion;

means for converting the ultrasonic echo signal into a corresponding electrical echo signal;

means for extracting a Doppler signal from the electrical echo signal, the Doppler signal being formed by the fluid, means for calculating data of a Doppler spectrum consisting of a plurality of instantaneous spectra each including a plurality of Doppler frequency components from the extracted Doppler signal, said Doppler spectrum having two dimensions consisting of a time dimension and a Doppler shift frequency dimension corresponding to a flow speed of the fluid;

means for smoothing the data of the Doppler spectrum in accordance with a speckle duration corresponding to a width of the ultrasonic beam signal; and means for tracing maximum frequencies of the smoothed data of the Doppler spectrum.

11. The Doppler-type ultrasonic diagnostic apparatus according to claim according to claim 10, wherein said maximum frequency tracing means comprises means for displaying the smoothed data of the Doppler spectrum in a frozen manner and an input device for manually tracing values of the maximum frequencies on the frozen-displayed Doppler spectrum.

12. The Doppler-type ultrasonic diagnostic apparatus according to claim according to claim 10, wherein said maximum frequency tracing means comprises means for automatically reading out values of the maximum frequencies from the smoothed data of the Doppler spectrum and outputting the read-out values of the maximum frequencies.

13. The Doppler-type ultrasonic diagnostic apparatus according to claim 10, wherein said smoothing means comprises means for averaging each frequency component of the plurality of instantaneous spectra determined from a time interval depending on the speckle duration over either one of a time direction and a frequency direction of the plurality of instantaneous spectra.

14. The Doppler-type ultrasonic diagnostic apparatus according to claim 13, wherein said averaging means includes a time calculating means for automatically calculating the time interval, a coefficient calculating means for calculating a coefficient corresponding to the calculated time interval, and an weighting delay/addition means for weightedly delaying and adding each frequency component of the plurality of instantaneous spectra using the calculated coefficient.

15. A Doppler-type ultrasonic diagnostic apparatus, in which a diagnostic portion of an object being examined is scanned by an ultrasonic beam signal, said diagnostic portion including a fluid such as blood in motion, the apparatus comprising:

means for transmitting the ultrasonic beam signal into the diagnostic portion and receiving an ultrasonic echo signal reflected by the diagnostic portion;

means for converting the ultrasonic echo signal into a corresponding electrical echo signal;

means for extracting a Doppler signal from the electrical echo signal, said the Doppler signal being formed by the fluid;

first means for calculating data of a Doppler spectrum consisting of a plurality of instantaneous spectra each including a plurality of Doppler frequency components from the extracted Doppler signal, said Doppler spectrum having two dimensions consisting of a time dimension and a Doppler shift frequency dimension corresponding to a flow speed of the fluid;

means for smoothing the data of the Doppler spectrum in accordance with a speckle duration corresponding to a width of the ultrasonic beam signal;

first means for displaying the smoothed data of the Doppler spectrum;

means for freezing the Doppler spectrum displayed by the first displaying means;

means for specifying an arbitrary time position on the Doppler spectrum frozen-displayed by the first displaying means;

second means for calculating data of a histogram of flow speeds of the fluid from the data of the Doppler spectrum in accordance with the time position specified by the specifying means; and second means for displaying the data of the histogram of flow speeds calculated by the second calculating means.

16. The Doppler-type ultrasonic diagnostic apparatus according to claim 15, wherein said smoothing means comprises means for averaging each frequency component of the plurality of instantaneous spectra determined from a time interval depending on the speckle duration over either one of a time direction and a frequency direction of the plurality of instantaneous spectra.

17. The Doppler-type ultrasonic diagnostic apparatus according to claim 16, wherein said averaging means includes a time calculating means for automatically calculating the time interval, a coefficient calculating means for calculating a coefficient corresponding to the calculated time interval, and an weighting delay/addition means for weightedly delaying and adding each frequency component of the plurality of instantaneous spectra using the calculated coefficient.

18. The Doppler-type ultrasonic diagnostic apparatus according to claim 17, wherein said time calculating means is a means for calculating a change rate in a flow speed of the fluid and determining, using the calculated change rate, the time interval during which characteristics of flow of the fluid are considered to be constant.

19. The Doppler-type ultrasonic diagnostic apparatus according to claim 17, wherein said weighting delay/addition means is a moving average circuit comprising a digital FIR filter.

* * * * *

UNITED STATES PATENT AND TRADEMARK OFFICE
CERTIFICATE OF CORRECTION

PATENT NO. : 5,485,844
DATED : January 23, 1996
INVENTOR(S) : Takanobu UCHIBORI

It is certified that error appears in the above-indentified patent and that said Letters Patent is hereby corrected as shown below:

Claim 11, Column 12, Line 7, delete "according to claim" (second occurrence);

Claim 12, Column 12, Line 14, delete "according to claim" (second occurrence);

Claim 15, Column 12, Line 46, delete "said";

Abstract, title Page, Line 12, delete "the" (second occurrence).

Signed and Sealed this

Twenty-ninth Day of October 1996

Attest:

BRUCE LEHMAN

*Attesting Officer*  *Commissioner of Patents and Trademarks*